(12) United States Patent
Isherwood (10) Patent No.: US 10,452,099 B2
(45) Date of Patent: Oct. 22, 2019

(54) HANDLING-NOISE BASED GESTURE CONTROL FOR ELECTRONIC DEVICES

(71) Applicant: Intel Corporation, Santa Clara, CA (US)

(72) Inventor: David Isherwood, Tampere (FI)

(73) Assignee: INTEL CORPORATION, Santa Clara, CA (US)

( * ) Notice: Subject to any disclaimer, the term of this patent is extended or adjusted under 35 U.S.C. 154(b) by 531 days.

(21) Appl. No.: 14/226,059

(22) Filed: Mar. 26, 2014

(65) Prior Publication Data

US 2015/0277743 A1 Oct. 1, 2015

(51) Int. Cl.
*G06F 1/16* (2006.01)

(52) U.S. Cl.
CPC .... *G06F 1/1626* (2013.01); *G06F 2200/1636* (2013.01)

(58) Field of Classification Search
CPC .............................. G06F 1/1626; G06F 3/048
USPC ........................................................ 715/863
See application file for complete search history.

(56) References Cited

U.S. PATENT DOCUMENTS

| 2011/0013785 | A1  | 1/2011 | Kim     |           |
|--------------|-----|--------|---------|-----------|
| 2011/0096036 | A1* | 4/2011 | McIntosh | G06F 3/043 |
|              |     |        |         | 345/177   |
| 2013/0082978 | A1* | 4/2013 | Horvitz | G06F 3/017 |
|              |     |        |         | 345/175   |
| 2013/0100036 | A1  | 4/2013 | Papakipos et al. | |
| 2013/0297926 | A1  | 11/2013| Eaton et al. | |
| 2014/0078086 | A1* | 3/2014 | Bledsoe | G06F 3/041 |
|              |     |        |         | 345/173   |

FOREIGN PATENT DOCUMENTS

WO WO-2011/046638 4/2011

OTHER PUBLICATIONS

Office Action dated Dec. 4, 2015 (+ English translation), in Taiwanese Patent Application No. 104104234, 14 pages.
International Search Report and Written Opinion of the International Searching Authority dated Apr. 20, 2015, in International Patent Application No. PCT/US2015/015484, 13 pages.
Decision to Grant in Taiwanese Application No. 104104234 dated Mar. 21, 2016, 2 pages.
International Preliminary Report on Patentability for International Patent Application No. PCT/US2015/015484 dated Oct. 6, 2016, 10 pgs.

* cited by examiner

*Primary Examiner* — Angie Badawi
(74) *Attorney, Agent, or Firm* — Womble Bond Dickinson (US) LLP (57) ABSTRACT

Embodiments are generally directed to handling-noise based gesture control for electronic devices. An embodiment of an apparatus includes a cover; multiple noise detection elements, the noise detection elements to detect handling-noise including noise generated by a command gesture performed on a surface of the cover of the apparatus, the plurality of noise detection elements including at least a first noise detection element in a first location and a second noise detection element in a second location; and a processor, the processor to process noise data generated by the plurality of noise detection elements to detect and identify the command gesture.

20 Claims, 6 Drawing Sheets

HANDLING-NOISE BASED GESTURE CONTROL FOR ELECTRONIC DEVICES

TECHNICAL FIELD

Embodiments described herein generally relate to the field of electronic devices and, more particularly, handling-noise based gesture control for electronic devices.

BACKGROUND

Electronic devices such as mobile devices may be utilized for a wide variety of different activities, with many activities utilizing one or more command gestures by a user.

In particular, command gestures are commonly performed by a user on a touchscreen of a mobile device. Various swipes and motions by a user across the touchscreen control many different functions for the mobile device. For example, a swiping motion commonly moves the contents of the screen in the direction of the motion, such as swiping downward to view material above the currently viewed material and swiping upward to view material that is below the currently viewed material on the touchscreen.

However, the touchscreen is also used by the user to receive visual information. While applying command gestures to a touchscreen allows a user to interact with images displayed on the touchscreen, the gestures will inevitably block at least a portion of the touchscreen from the view of the user during the performance of the gesture. As a result, it is generally not possible to view the entire screen of a device at the same time as making inputs using gestures on the touchscreen.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to handling-noise based gesture control for electronic devices.

For the purposes of this description:

"Mobile device" means a smartphone, smartwatch, tablet computer, handheld computer, mobile Internet device, wearable technology, or other mobile electronic device that includes processing ability.

"Cover" or "case" means an outer portion of an electronic device that may enclose internal components of the device. As used here, cover or case means an integral portion of a device that generally is not removed (which may be referred to herein as an integral cover of the device), or a removable cover or case that may cover the integral cover of the device, or other type of covering for the device (which may be referred to herein as a removable cover for the device).

"Touchscreen" means an electronic visual display for an electronic device that includes both display capability and touch sensitivity. A touchscreen commonly allows input of data or commands by a user through contact or proximity (generally referred to as touch) with the touchscreen by a user, where the touch may include use of a user's finger or a device such as a stylus. A touchscreen may include, but is not limited to, a capacitive touchscreen.

"Handling-noise" means acoustic or mechanical impact to a device derived from a user handling the device. Handling noise includes, but is not limited to, sound or vibration generated by a user performing a command gesture on a surface of a cover of the device. In one example, handling noise includes sound or vibration generated by a user tapping a finger on the surface of a cover of a device, the user dragging a finger across the surface of the cover of the device, or other operations using the surface of the device.

"Command gesture" means a gesture made by a user of an electronic device to provide a certain instruction or other input to the electronic device. A command gesture may include multiple gesture components.

Electronic devices such as mobile devices often include a touchscreen by which a user of the mobile device can both receive visual images on the display and input information or instructions through the use of command gestures on the touchscreen. Command gestures are commonly input on a touchscreen using a fingertip of the user, a stylus handled by the user, or other similar input.

However, by the nature of a touchscreen, a mobile device can display images throughout the touchscreen. The entry of gestures on the touchscreen will block at least some portion of the touchscreen from the view of a user of the mobile device during the entry of gestures on the touchscreen.

In some embodiments, an electronic device provides for handling-noise based gesture operation. In some embodiments, the electronic device provides for detection and identification of a command gesture using utilizing timing of a detected noise and comparison with a detected noise with a noise signature. In some embodiments, an electronic device such as a mobile device allows for entry of certain command gestures on the mobile device without blocking a view of the touchscreen by a user. In some embodiments, a mobile device includes back cover handling-noise based swipe control using multiple noise detection elements, such as, for example, multiple integrated microphones. In some embodiments, such an apparatus allows for user interface interaction with the mobile device using off-screen based gesture control, where the gesture is made using a surface of a cover of an apparatus without use of any control elements on such cover.

In some embodiments, acoustical or mechanical coupling between gesture components such as finger taps or swipes on the back cover performed by, for example, the index finger of the hand holding the device are interpreted as certain gestures by the mobile device. In some embodiments, command gesture may be interpreted as, for example, user interface motion swipes up or down depending on the timing of the detection of the finger tapping sound on the back cover at each motion detection elements and the sound signature of a swipe, which are examples of handling-noise for the device.

In some embodiments, the detection and interpretation of a gesture includes a calculation based on the time of arrival of a noise for each of multiple detection elements of a device, such as multiple microphones. For example, a modern mobile device may contain two microphones, wherein typically a first primary microphone is located near a bottom of the mobile device (as the device is handled upright by a user) and a second secondary microphone is located near a top of the mobile device.

In some embodiments, the identification of a command gesture by an electronic device further includes comparison of noise generated by a component of the gesture as detected by one or more noise detection elements with a noise signature. In some embodiments, an electronic device includes storage or one or more noise signatures for use in comparing with detected noise. In some embodiments, the noise signatures may be pre-programmed with an electronic device, may be learned by the device through a training session with a user, or other stored on the device for comparison with detected noises.

In some embodiments, a mobile device including handling-noise gesture recognition may be utilized to allow certain limited touch-based user interface swipe controls to be made using, for example, the back cover of the mobile device without requiring that additional touch components be added to the back cover, and, in operation, without the user being required to use the user's free hand in making gestures.

Figure 1A:
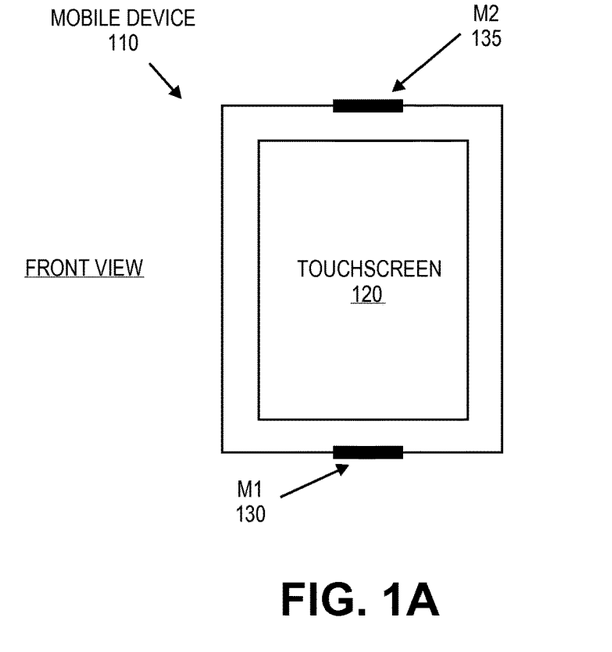
FIGS. 1A and 1B are illustrations of an embodiment of an electronic device.
Figure 1B:
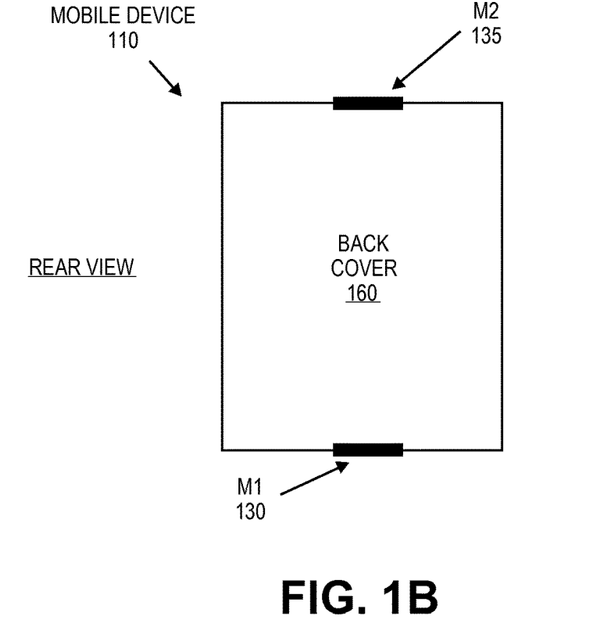

FIGS. 1A and 1B are illustrations of an embodiment of an electronic device. FIG. 1A is an illustration of a front view of an electronic device such as a mobile device 110, where, as used herein, a first front side of a mobile device is a side of the mobile device 110 that includes a primary display for the mobile device, such as the primary display being a touchscreen 120. As further used herein, a second opposite side of the mobile device that does not contain a primary screen (and may not contain any control elements) is referred to as a back side of the mobile device. Other sides of the mobile device are generally referred to as edges of the mobile device, but embodiments are not limited to any particular geometry of a mobile device and the other sides of the mobile device may have more than minor thicknesses in some examples.

As is common with modern mobile devices, the touchscreen 120 may take up a majority of the front side of the mobile device 110, as shown in FIG. 1A. The mobile device 110 will generally include one or more physical buttons, switches, or other controls on the front side or edges of the mobile device, but such physical buttons or switches are not illustrated in FIGS. 1A or 1B.

In some embodiments, the mobile device 110 includes noise detection elements (which may also be referred to as noise detectors) to detect handling-noise for the mobile device, where the detection elements may include one or more microphones, one or more vibration sensors, or one or more other types of detection elements. In some embodiments, the multiple detection elements may include multiple microphones, such as a primary microphone M1 130 and a secondary microphone M2 135. Many modern mobile phones, including smart phones, currently include two microphones for either uplink noise cancellation in voice calls or for stereo audio capture. The "primary" microphone outlet is typically placed on a bottom edge of the device, such as the illustrated microphone M1. The "secondary" microphone is typically placed on, or near, a top edge of the device, such as the illustrated microphone M2 135. However, embodiments are not limited to the use of the primary and secondary microphones as the detection elements for the mobile device 110. While the examples provided herein generally describe a device including two noise detection elements, embodiments are not limited to two such elements, and may include more than two noise detection elements, which may allow for a more precise determination of the location of an impact generating a noise.

FIG. 1B illustrates a rear view of the mobile device 110, including a back cover 160 of the mobile device. In some embodiments, the mobile device utilizes multiple noise detection elements, such as M1 130 and M2 135, to detect command gestures made on the back cover 160 of the mobile device 110, such as gestures made by a finger of a hand of a user who is holding the mobile device.

Figure 2A:
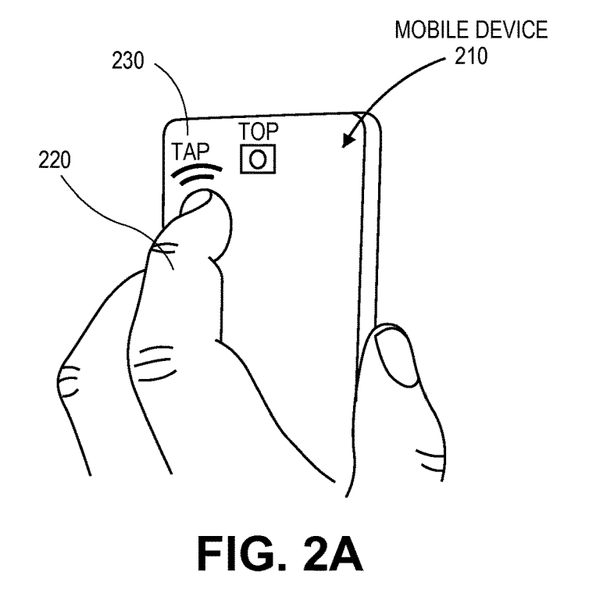
FIGS. 2A and 2B illustrate the operation of an embodiment of an electronic device utilizing handling-noise based gesture control for a first command gesture.
Figure 2B:
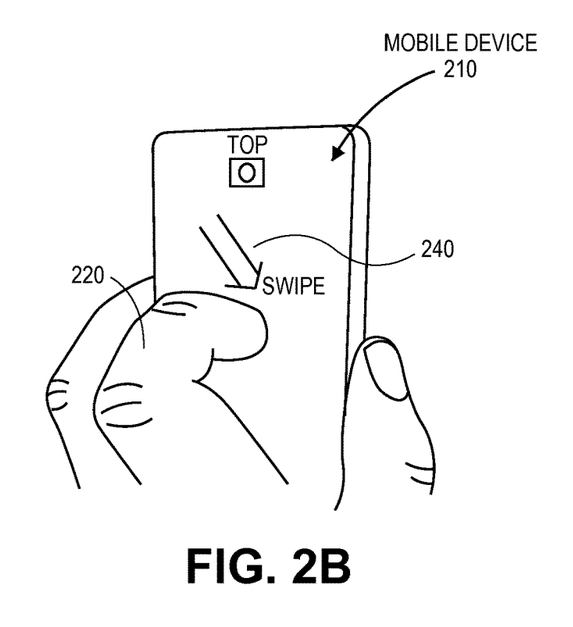

FIGS. 2A and 2B illustrate the operation of an embodiment of an electronic device utilizing handling-noise based gesture control for a first command gesture. In some embodiments, a electronic device is operable to detect and identify a command gesture made on a surface of a case of the electronic device based at least in part on handling-noise detected by multiple noise detection elements of the electronic device, where the noise detection elements may include, but are not limited to, one or more microphones.

In an example, when a user taps or rubs their hand or fingers against the surface of the back cover of an electronic device, this motion is picked up by the microphones or other noise detectors either acoustically or through mechanical coupling. In an example, a user may typically hold a mobile device by cupping the user's hand around the back of the device when, for example, looking at the screen in a portrait orientation. This handling of the mobile device can leave one or more fingers of the hand of the user holding the mobile device, such as the index finger of such hand, to comfortably perform a limited set of motions to communicate with a mobile device.

In some embodiments, a mobile device is operable to utilize detected command gestures performed by a user on a surface of a cover of the mobile device to provide certain commands in one or more functions or applications (commonly referred to as apps) of the mobile device. In one example, a user who is operating an Internet browser on the device typically is able to scroll up or down on a webpage, which conventionally may involve a downward swipe or an upward swipe on a touchscreen of the mobile device. In some embodiments, a mobile device is operable to provide scrolling up or down in a webpage where the command to scroll up or down is a swipe on the cover of the mobile device screen that is detected using multiple noise detectors of the mobile device.

FIG. 2A illustrates the operation of an embodiment of a mobile device utilizing handling-noise based gesture control to detect an initial gesture component to begin a command gesture. In some embodiments, a gesture for a command may include an initial gesture component, which may be an initial tap or other similar impact on the cover of the mobile to announce the beginning of the command gesture. In some embodiments, a mobile device 210 is operable to detect the initial tap 230 on the back cover of the mobile device by a finger 220 of a user. In the particular example illustrated in FIG. 2A, the impact of the tap is in an upper portion of the cover of the mobile device 210. In some embodiments, the mobile device 210 may utilize the initial gesture component to improve the detection and interpretation of the command gesture performed by a user. However, embodiments are not limited to use of an initial gesture component to begin a command gesture.

In some embodiments, the mobile device utilizes the multiple noise detectors to determine a location of the initial tap using differences in timing for noise detection, where the determined location may be a relative location with response to the noise detectors. For example, if a mobile device includes a first noise detector that is nearer to a bottom of the mobile device, such as a first primary microphone at or near the bottom of the device, and a second noise detector that is nearer to a top of the mobile device, such as a secondary microphone at or near the top of the mobile device, the mobile device may determine that the tap 230 is nearer to the second noise detector based on the fact that the noise is detected significantly sooner at the second noise detector than at the first noise detector. In some embodiments, a mobile device may be required only to determine whether or not there is a significant difference between arrival times at the multiple noise detectors, such as in circumstances in which the expected impacts are located either at an upper portion of the cover of the mobile device, in which case there is a significant difference in arrival times at the noise detectors, or in a middle portion of the cover of the mobile device, in which case there is not a significant different in arrival times at the noise detectors. In some embodiments, the mobile device 210 is operable to determine that a second gesture component is expected to follow the tap 230 and the following gesture component is expected begin at an upper portion of the back cover of the mobile device.

FIG. 2B illustrates the operation of an embodiment of a device utilizing handling-noise based gesture control to detect a second component of a command gesture. In some embodiments, the mobile device 210 is operable to detect a downward swipe action 240 performed on the surface of the cover of the mobile device 210 by a finger of the mobile device. In some embodiments, the downward swipe motion 240 may be interpreted as a downward swipe command using at least in part the determined location of the acoustic or mechanical impulse of the initial finger tap 230 in an upper portion of the back cover followed by the detection of a noise signature for the swipe 240 of the finger across the back cover.

In some embodiments, the mobile device 210 is operable to reject certain random handling-noises that are detected. In some embodiments, a mobile device 210 is operable to detect and identify a gesture as a downward swipe command gesture if the swipe action 240 on the cover of the mobile device is detected within a certain time T after the initial tap 230 is detected, thus enabling the mobile device 210 to reject certain random impacts on the case of the mobile device as being noise that is not intended to be a command gesture.

In some embodiments, additional noise detections may be utilized to further improve gesture detection. In an example, in addition to an initial gesture component (such as a tap) before commencing a swipe motion an electronic device may be operable to detect an additional ending gesture component (such as a second tap). In this example, for a downward swipe, a user may tap the device at a first location near where the swipe is to begin, then perform the swiping motion downward, and then tap the device in a second location near where the swiping motion ended. In this example, the electronic device may utilize the difference in timing measurements between the first tap and the second tap to determine whether the swiping motion was upward or downward.

Figure 3A:
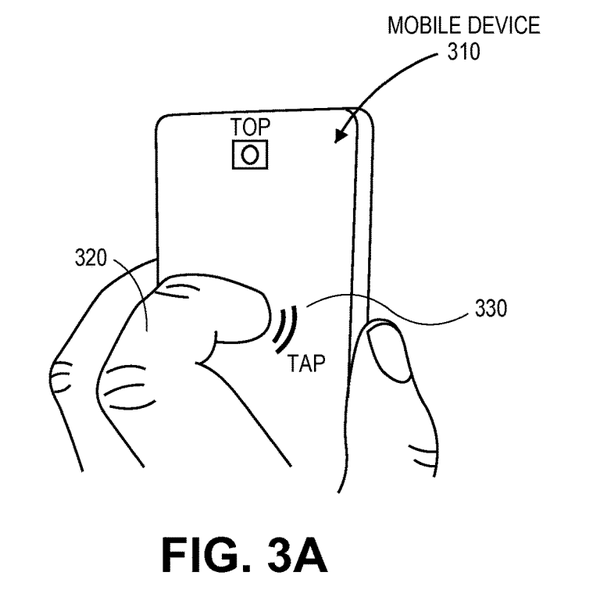
FIGS. 3A and 3B illustrate the operation of an embodiment of an electronic device utilizing handling-noise based gesture control for a second command gesture.
Figure 3B:
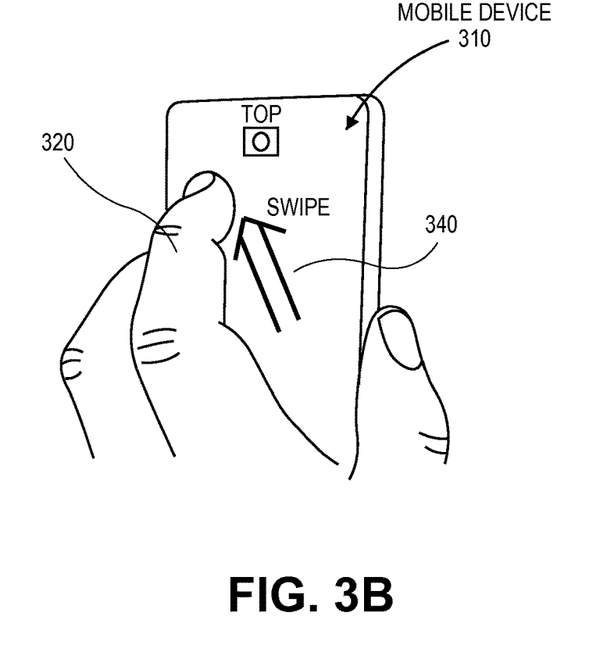

FIGS. 3A and 3B illustrate the operation of an embodiment of an electronic device utilizing handling-noise based gesture control for a second command gesture. FIG. 3A illustrates the operation of an embodiment of a device utilizing handling noise based gesture control to detect an initial action to commence a command gesture. In some embodiments, a mobile device 310 is operable to detect the initial gesture component that commences a command gesture, such as a tap 330 on the back cover of the mobile device by a finger 320 of a user.

For example, if a mobile device includes a first noise detector that nearer to a bottom of the mobile device, such as a first primary microphone at or near the bottom of the device, and a second noise detector that is nearer to a top of the mobile device, such as a secondary microphone at or near the top of the mobile device, the mobile device may determine that the tap 330 is located in a middle portion of the case (which is likely where an upward swipe gesture will begin) based on the fact that the noise is detected at a similar time at the first noise detector and at the second noise detector.

FIG. 3B illustrates the operation of an embodiment of a device utilizing handling-noise based gesture control to detect a second component of a command gesture. In some embodiments, the mobile device 310 is operable to detect an upward swipe action 340 performed on the surface of the cover of the mobile device 310 by a finger 320 of a user of the mobile device 310. In some embodiments, the gesture may be interpreted as an upward swipe command gesture based at least in part on the determined location of the acoustic or mechanical impulse of the initial finger tap 320 in a middle portion of the back cover followed by the detection of a noise signature for the swipe 340 of the finger across the back cover.

Figure 4:
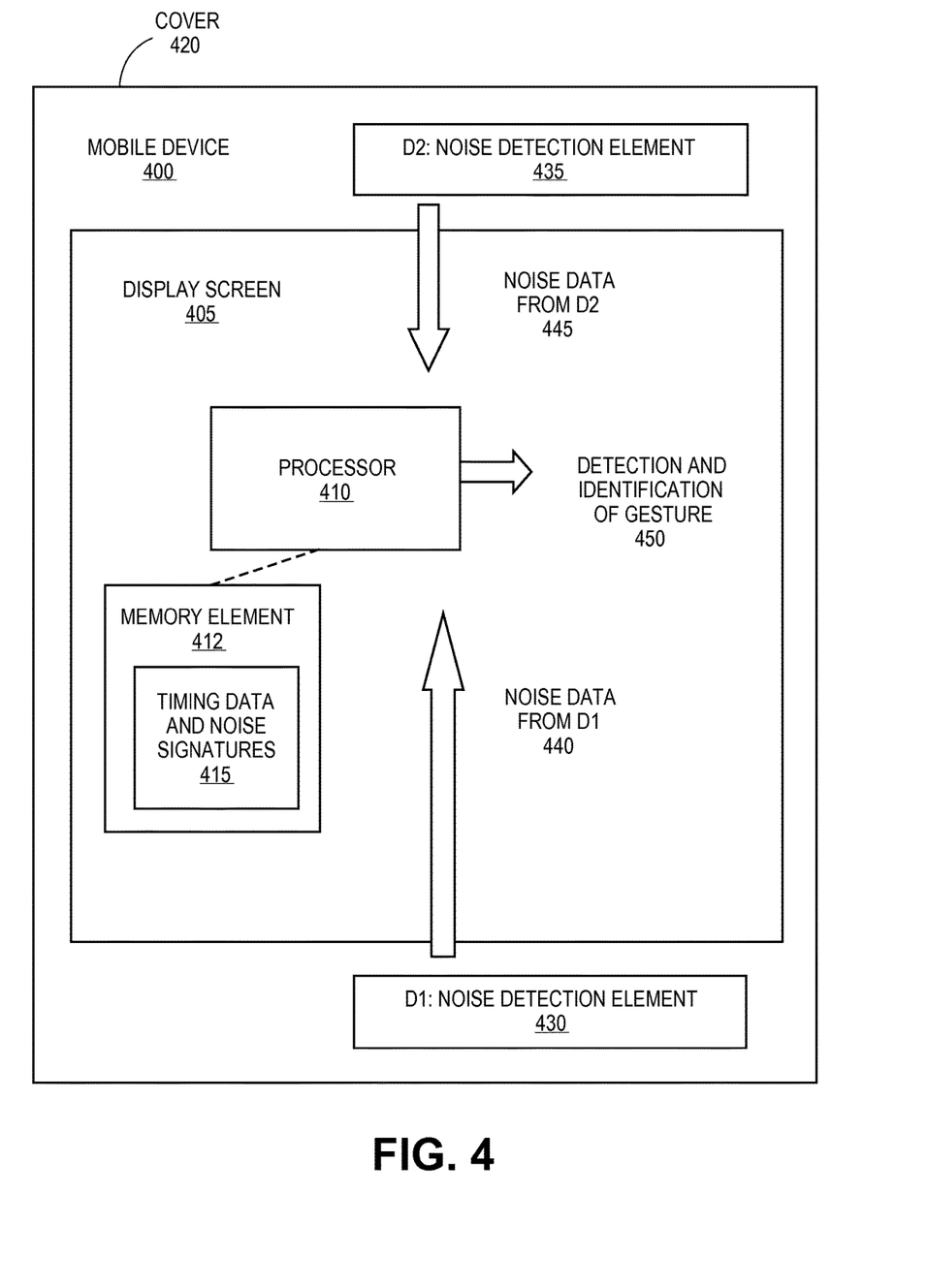
FIG. 4 is an illustration of an embodiment of a mobile device providing handling-noise based gesture control.

FIG. 4 is an illustration of an embodiment of a mobile device providing handling-noise based gesture control. In some embodiments, a mobile device 400 includes a cover 420, which may be an integral cover, a removable cover, or both. In some embodiments, the mobile device may include a display screen 405, such as a touchscreen, on a first (front) side of the mobile device and a back cover that may not include any input elements.

In some embodiments, the mobile device may include multiple noise detection elements to detect noise, including, for example, noise detection element D1 430 in a first location (such as a first integrated microphone) and noise detection element D2 435 in a second location (such as a second integrated microphone).

In some embodiments, the mobile device 400 is operable to detect and identify one or more command gestures that are performed on a surface of the cover 420, such as on a surface of the back cover of the device, utilizing timing of a detected noise and comparison with a detected noise with a noise signature. In some embodiments, noise data from D1 440 and noise data from D2 445 is provided to a processing unit, such as processor 410, where the processor utilizes the noise data 440-445 to detect and identify the gesture. In some embodiments, detection and identification of the gesture includes comparison of timing of noise detection between the D1 and D2 noise detection elements to determine a location of an gesture component, such as the detection of a location on the back cover of a tap that occurs before a second action of the gesture, after the second action of the gesture, or both.

In some embodiments, the mobile device 400 includes a memory element 412 that may include timing data for location determination and one or more noise signatures 415. In some embodiments, the processor is to compare noise data from one or more of the noise detection elements against the one or more noise signatures 415 in the detection and identification of a gesture. In an example, the noise signatures 415 may include a noise signature for a swipe of a finger across the surface of the cover 420 of the mobile device 400.

In an example, the mobile device 400 may utilize the received noise data 440-445 from the D1 and D2 noise detection elements to determine that a tap on the case 420 has occurred and that the tap was made in an upper portion of the case (because there is a significant difference between the time of detection of the tap at D1 and D2), and that a swiping gesture component was made on the back cover (because a second detected noise matches a second noise signature for a swipe across the surface of the case of the mobile device), and interprets the command gesture as an downward swipe by the user (based on the detection of a tap on an upper portion of the back case of the mobile device followed by a swipe across the surface of the back case of the mobile device).

In some embodiments, the mobile device may provide user feedback for a detected and identified command gesture, such as providing an image on the display screen that represents the identified command gesture. While embodiments are not limited to any particular image, in one example a downward swipe on the rear cover of the mobile device may result in the display of a line being drawn from an upper location on the display screen 405 to a lower location on the display screen, or other similar feedback image.

Figure 5:
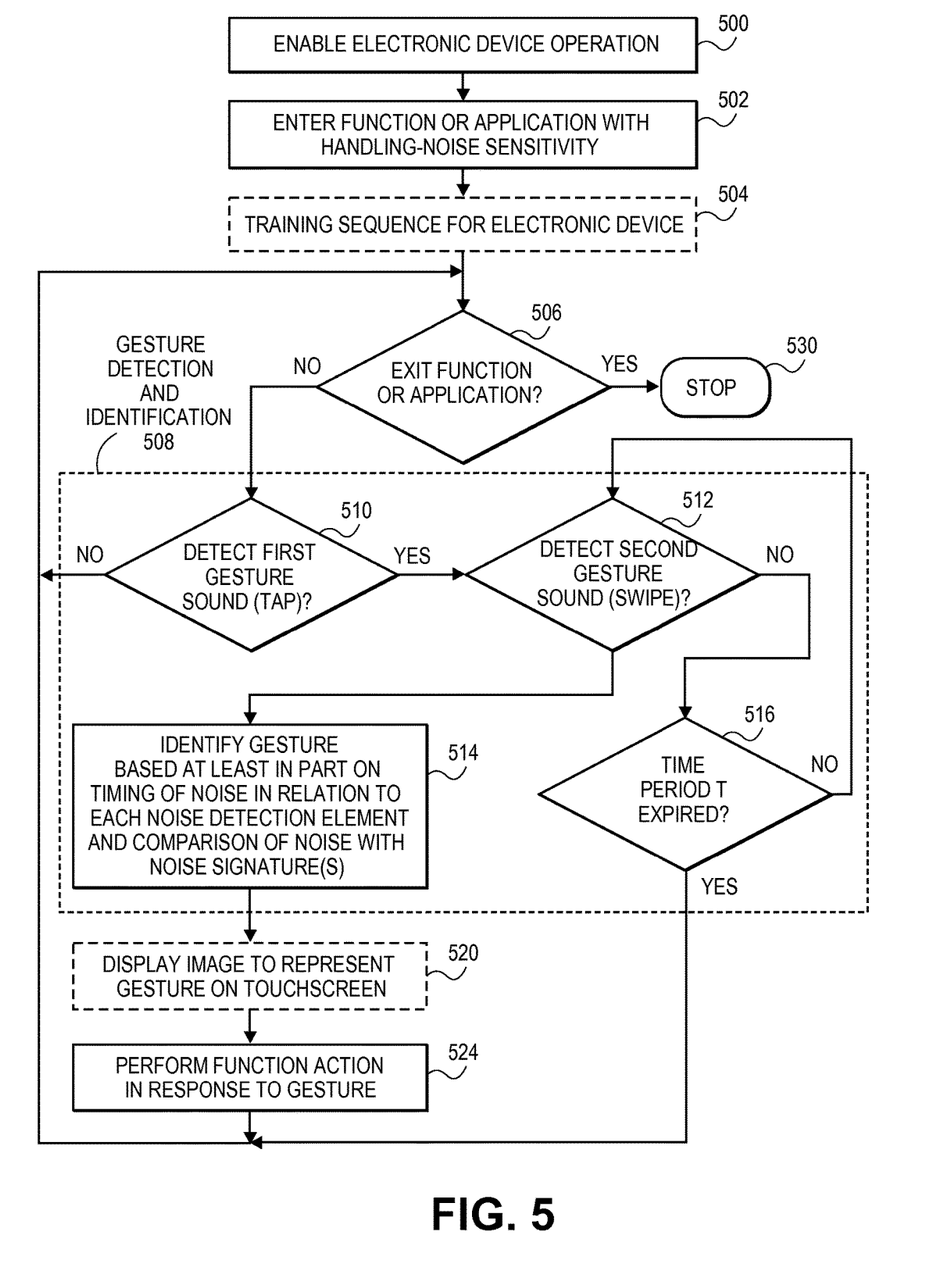
FIG. 5 is a flow chart to illustrate a process for handling-noise based gesture control for an electronic device.

FIG. 5 is a flow chart to illustrate a process for handling-noise based gesture control for an electronic device. In some embodiments, an electronic device is enabled 500, and the electronic device may enter a function or application that includes handling-noise sensitivity for gesture recognition 502. In some embodiments, a process may include an optional gesture recognition training sequence for the electronic device 504, where the training sequence may include a user of the electronic device being requested to perform certain gesture components, with the electronic device determining and recording one or more of timing data for a gesture component and a noise signature of a gesture component. In one example, an electronic device may request a user to perform a particular gesture, such as tapping and swiping downward for a downward swipe gesture or tapping and swiping upward from an upward swipe gesture. The training sequence may be used as needed for the electronic device. In some embodiments, the training sequence may be performed when a user first uses a device, or may be performed when a removable cover is added to a device or is changed to a new removable cover.

In some embodiments, if the electronic device has not exited the function or application 506, which may result in stopping the gesture recognition 530, the electronic device is to perform gesture detection and identification 508. In some embodiments, the gesture detection and identification 508 includes determination of timing of a gesture component and includes comparison of a gesture component with a noise signature. An example of gesture detection and identification for a particular command gesture is illustrated in FIG. 5, but specific processes may vary depending on factors such as the particular noise detection elements of a device and the type of command gesture being detected and identified. As illustrated in FIG. 5, gesture detection and identification 508 may include detecting a sound of a first gesture component 510, where the first gesture sound may be a short impact on the cover of the electronic device, such as a tapping on the cover of the device. In some embodiments, if the sound of the first gesture component is detected, there is a determination whether a subsequent sound of a second gesture component is detected 512, where the sound may be a swiping motion across the surface of the cover of the device. In some embodiments, the detection of the swiping motion may be made by comparing the detected noise with a noise signature for a swiping motion. If the second gesture component has not been detected 512 and a certain time period T has expired 516, the electronic device may determine that a command gesture was not intended and return to gesture detection. If the second gesture component is detected prior to expiration of time period T, then the electronic device is to identify the command gesture on the cover of the device based at least in part on the timing of a noise in relation to each noise detection element of the device and comparison of a noise with one or more noise signatures 514. In the example illustrated in FIG. 5, the identification may include determining the location of the tap on the cover of the electronic device (such as a tap on a upper portion of the cover of the device or a tap on a middle portion of the cover of the device) and, combined with a match in the comparison of the noise of the second gesture component, the gesture may be identified as a downward swipe or an upward swipe.

In some embodiments, the electronic device may optionally provide feedback to a user regarding a detected command gesture 520, such as providing an image on the display to illustrate the command gesture, such as illustrating the identified upward or downward swipe (if, for example, this is useful and does not interfere with the displayed image). In some embodiments, the electronic device performs an action in response to the identified gesture 524, such as moving the contents of the screen display in response to the upward or downward swipe.

Figure 6:
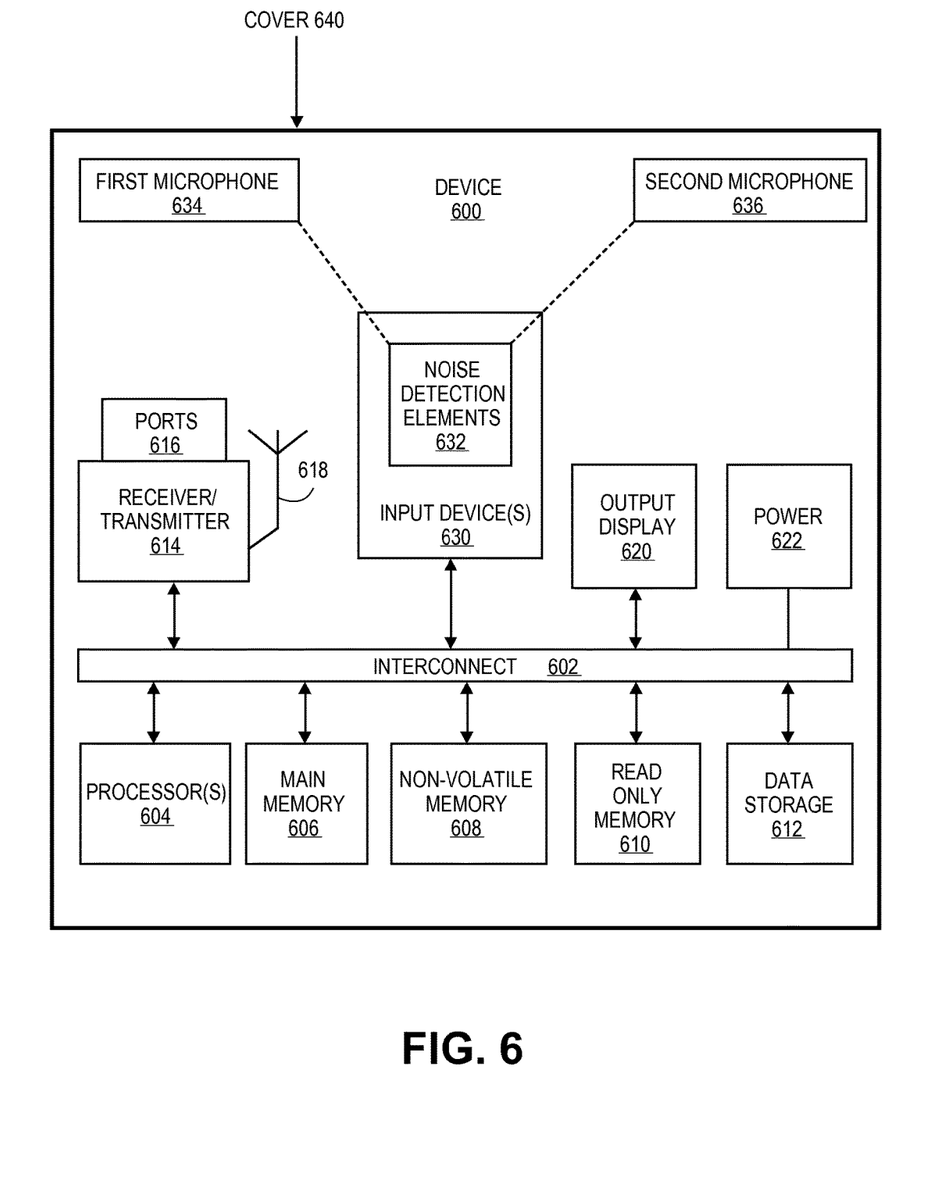
FIG. 6 is an illustration of an embodiment of an electronic apparatus or system to provide handling-noise based gesture control.

FIG. 6 is an illustration of an embodiment of an electronic apparatus or system to provide handling-noise based gesture control. In this illustration, certain standard and well-known components that are not germane to the present description are not shown. Elements shown as separate elements may be combined, including, for example, an SoC (System on Chip) combining multiple elements on a single chip. The apparatus or system may include, but is not limited to, a mobile device.

Under some embodiments, the apparatus or system 600 (referred to generally herein as an apparatus) includes a cover 640, wherein the cover may be an integral cover or a removable cover.

In some embodiments, the apparatus 600 includes one or more input devices 630 for the input of data, including hard and soft buttons, a joy stick, a mouse or other pointing device, voice command system, or gesture recognition system. In some embodiments, the input devices includes multiple noise detection devices 632, which may be, for example, a first microphone 634 in a first location (such as a primary microphone) and a second microphone 636 in a second location (such as a secondary microphone). In some embodiments, the apparatus 600 is operable to detect and identify one or more gestures performed on the cover 640 using noise data generated by the multiple detection devices 632.

In some embodiments, the apparatus 600 includes an interconnect 602 or other communication means for transmission of data, the input devices 630 being coupled with the interconnect 602. The interconnect 602 is illustrated as a single interconnect for simplicity, but may represent multiple different interconnects or buses and the component connections to such interconnects may vary. The interconnect 602 shown in FIG. 6 is an abstraction that represents any one or more separate physical buses, point-to-point connections, or both connected by appropriate bridges, adapters, or controllers.

In some embodiments, the apparatus 600 may include a processing means such as one or more processors 604 coupled to the interconnect 602 for processing information. The processors 604 may comprise one or more physical processors and one or more logical processors. In some embodiments, the processors may include one or more general-purpose processors or special-processor processors. In some embodiments, the processors 604 operate to process handling-noise data received from the noise detection elements 632 to detect and interpret one or more command gestures performed on the cover 640 of the apparatus 600.

In some embodiments, the apparatus 600 includes one or more transmitters or receivers 614 coupled to the interconnect 602. In some embodiments, the apparatus 600 may include one or more antennae 618, such as dipole or monopole antennae, for the transmission and reception of data via wireless communication, and one or more ports 616 for the transmission and reception of data via wired communications.

In some embodiments, the apparatus 600 further comprises a random access memory (RAM) or other dynamic storage device or element as a main memory 606 for storing information and instructions to be executed by the processors 604. The apparatus 600 may include one or more non-volatile memory elements 608, including, for example, flash memory, for the storage of certain elements. The apparatus 600 also may comprise a read only memory (ROM) 610 or other static storage device for storing static information and instructions for the processors 604, and data storage 612, such as a solid state drive, for the storage of data. In some embodiments, memory of the apparatus 600 may include storage of timing data and noise signatures used in the detection and identification of command gestures using handling-noise detected by the noise detection elements 632.

In some embodiments, the apparatus 600 includes an output display 620, where the display 620 may include a liquid crystal display (LCD) or any other display technology, for displaying information or content to a user. In some environments, the display 620 may include a touch-screen that is also utilized as at least a part of an input device 630.

The apparatus 600 may also comprise a battery or other power source 622, which may include a solar cell, a fuel cell, a charged capacitor, near field inductive coupling, or other system or device for providing or generating power in the apparatus 600. The power provided by the power source 622 may be distributed as required to elements of the apparatus 600.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, an apparatus includes a cover; multiple noise detection elements, the noise detection elements to detect handling-noise including noise generated by a command gesture performed on a surface of the cover of the apparatus, the plurality of noise detection elements including at least a first noise detection element in a first location and a second noise detection element in a second location; and a processor, the processor to process noise data generated by the plurality of noise detection elements to detect and identify the command gesture.

In some embodiments, the processing of the noise data includes one or more of: detecting a location of a first component of the command gesture; and comparing a second component of the command gesture with a noise signature.

In some embodiments, detecting a location of the first component of the command gesture includes comparing timing of detection of a noise at each of the noise detection elements.

In some embodiments, the first component of the command gesture is a tap on the surface of the cover. In some embodiments, the second component of the command gesture is a swipe across the surface of the cover.

In some embodiments, the apparatus further includes a display screen on a front side of the apparatus, the command gesture being performed on an opposite back side of the apparatus.

In some embodiments, the processing of the noise data includes rejecting a noise as a command gesture if a second component of a command gesture is not detected within a predetermined amount of time after detection of a first component of the command gesture.

In some embodiments, the first noise detection element is a first microphone and a second noise detection element is a second microphone.

In some embodiments, the apparatus further includes a memory element to store one or more of one or more noise signatures; and timing data for detecting a location of a noise.

In some embodiments, the processor is to perform a gesture recognition training sequence for the mobile device.

In some embodiments, a mobile device includes a touchscreen display; a cover including a front side containing the touchscreen display and a back side; a first microphone and a second microphone to detect handling-noise including noise generated by a command gesture performed on a surface of the back side of the cover of the mobile device, the first microphone being in a first location in the cover and the second microphone being in a second location in the cover; and a processor, the processor to process noise data generated by first and second microphones to detect and identify the command gesture.

In some embodiments, the processing of the noise data includes one or more of detecting a location of a first component of the command gesture; and comparing a second component of the command gesture with a noise signature.

In some embodiments, detecting the location of the first component of the command gesture includes comparing timing of detection of a noise at the first microphone and at the second microphone.

In some embodiments, detecting the location of the first component of the command gesture includes identifying a portion of the cover receiving an impact.

In some embodiments, the first component of the command gesture is a tap on the surface of the cover.

In some embodiments, the second component of the command gesture is a swipe across the surface of the cover.

In some embodiments, the mobile device further includes a memory element to store one or more of one or more noise signatures; and timing data for detecting a location of a noise.

In some embodiments, the processing of the noise data includes rejecting a noise as a command gesture if a second component of a command gesture is not detected within a predetermined amount of time after detection of a first component of the command gesture.

In some embodiments, the processor of the mobile device is to perform a gesture recognition training sequence for the mobile device.

In some embodiments, a non-transitory computer-readable storage medium having stored thereon data representing sequences of instructions that, when executed by a processor, cause the processor to perform operations including detecting handling-noise with multiple noise detectors, the handling-noise being related to a command gesture performed on a cover of a mobile device; processing noise data generated by a first microphone and by a second microphone to detect and identify the command gesture performing an action in response to the command gesture; and performing an action in response to the identified command gesture.

In some embodiments, processing the noise data includes one or more of detecting a location of a first component of the command gesture; and comparing a second component of the command gesture with a noise signature.

In some embodiments, detecting a location of the first component of the command gesture includes comparing timing of detection of a noise at the first microphone and at the second microphone.

In some embodiments, the medium further includes instructions for rejecting a noise as a command gesture if a second component of a command gesture is not detected within a predetermined amount of time after detection of a first component of the command gesture.

In some embodiments, the medium further includes instructions for performing a training sequence for the mobile device.

In some embodiments, an apparatus includes a means for detecting handling-noise with a plurality of noise detectors, the handling-noise being related to a command gesture performed on a cover of a mobile device; a means for processing noise data generated by a first microphone and by a second microphone to detect and identify the command gesture performing an action in response to the command gesture; and a means for performing an action in response to the identified command gesture.

In some embodiments, the means for processing the noise data includes one or more of a means for detecting a location of a first component of the command gesture; and a means for comparing a second component of the command gesture with a noise signature.

In some embodiments, the means for detecting a location of the first component of the command gesture includes a means for comparing timing of detection of a noise at the first microphone and at the second microphone.

In some embodiments, the apparatus further includes a means for rejecting a noise as a command gesture if a second component of a command gesture is not detected within a predetermined amount of time after detection of a first component of the command gesture.

In some embodiments, the apparatus further includes a means for performing a training sequence for the mobile device.

In some embodiments, a method includes detecting handling-noise with a plurality of noise detectors, the handling-noise being related to a command gesture performed on a cover of a mobile device; processing noise data generated by a first microphone and by a second microphone to detect and identify the command gesture performing an action in response to the command gesture; and performing an action in response to the identified command gesture.

In some embodiments, processing the noise data includes one or more of detecting a location of a first component of the command gesture; and comparing a second component of the command gesture with a noise signature.

In some embodiments, detecting a location of the first component of the command gesture includes comparing timing of detection of a noise at the first microphone and at the second microphone.

In some embodiments, the method further includes rejecting a noise as a command gesture if a second component of a command gesture is not detected within a predetermined amount of time after detection of a first component of the command gesture.

In some embodiments, the method further includes performing a training sequence for the mobile device for detection of command gestures using noise data.

In some embodiments, the method further includes providing feedback to a user regarding an identified command gesture.

In some embodiments, providing feedback includes providing an image on a display to illustrate the identified command gesture.

What is claimed is:

1. An apparatus comprising:
a case, the case including a front cover and an opposite back cover, and the case further including a top edge and a bottom edge;
a plurality of noise detection elements in the case, the noise detection elements to detect handling-noise and to generate noise data in response to the detection of the handling-noise, the handling noise including noise generated by a command gesture that is performed on a surface of the back cover of the apparatus, the plurality of noise detection elements including at least a first noise detection element in a first location and a second noise detection element in a second location, wherein the first location is nearer to the top edge of the case than the second location and the second location is nearer to the bottom edge of the case than the first location; and
a processor, the processor to process the noise data generated by the plurality of noise detection elements to detect and identify the command gesture;
wherein the processing of the noise data includes at least the following:
detecting a location on the back cover of a first component of the command gesture performed on the back cover, the first component of the command gesture including a tap on the surface of the back cover, wherein detecting a location of the first component of the command gesture by performing a calculation based on a time of arrival of when a first noise is detected at each of the noise detection elements,
detecting a second component of the command gesture performed on the back cover;
in response to detecting the second component, determining that noise associated with the second component occurs within a predetermined time after the first noise and performing a comparison with a noise signature, the second component of the command gesture including a swipe across the surface of the back cover, and
determining whether the command gesture represents a first command for the apparatus based at least in part on: the first component and the second component of the command gesture and the determining that the noise occurs within the predetermined time, and, upon determining that the command gesture represents a first command for the apparatus, performing the first command.

2. The apparatus of claim 1, further comprising a display screen in the front cover of the apparatus, wherein the performing the first command includes scrolling upward or downward on the display screen.

3. The apparatus of claim 1, wherein the first noise detection element is a first microphone and a second noise detection element is a second microphone.

4. The apparatus of claim 1, wherein the surface of the back cover is not touch sensitive.

5. A mobile device comprising:
a touchscreen display;
a case including a front cover containing the touchscreen display and an opposite back cover, and the case further including a top edge and a bottom edge;
a first microphone and a second microphone to detect handling-noise and to generate noise data in response to the detection of the handling noise, the handling noise including noise generated by a command gesture that is performed on a surface of the back cover of the mobile device, the first microphone being in a first location in the case and the second microphone being in a second location in the case, wherein the first location is nearer to the top edge of the case than the second location and the second location is nearer to the bottom edge of the case than the first location; and
a processor, the processor to process the noise data generated by first and second microphones to detect and identify the command gesture
wherein the processing of the noise data includes at least the following:
detecting a location on the back cover of a first component of the command gesture on the back cover, the first component of the command gesture including a tap on the surface of the back cover, wherein detecting a location of the first component of the command gesture by performing a calculation based on a time of arrival of when a first noise is detected at the first microphone and at the second microphone,
detecting a second component of the command gesture performed on the back cover;
in response to detecting the second component, determining that noise associated with the second component occurs within a predetermined time after the first noise and performing a comparison with a noise signature, the second component of the command gesture including a swipe across the surface of the back cover, and
determining whether the command gesture represents a first command for the apparatus based at least in part on: the first component and the second component of the command gesture and the determining that the noise occurs within the predetermined time, and, upon determining that the command gesture represents the first command for the apparatus, performing the first command.

6. The mobile device of claim 5, wherein detecting the location of the first component of the command gesture includes identifying a portion of the back cover receiving an impact.

7. The mobile device of claim 5, further comprising a memory element to store one or more of:
   one or more noise signatures; and
   timing data for detecting a location of a noise.

8. The mobile device of claim 5, wherein the processing of the noise data includes rejecting a noise as a command gesture upon a predetermined amount of time elapsing after detection of a first component of the command gesture without detection of a second component of a command gesture.

9. The mobile device of claim 5, wherein the processor is to perform a gesture recognition training sequence for the mobile device.

10. The mobile device of claim 5, wherein the surface of the back cover is not touch sensitive.

11. The mobile device of claim 5, wherein performing the first command includes scrolling upward or downward on the touchscreen display of the mobile device.

12. A non-transitory computer-readable storage medium having stored thereon data representing sequences of instructions that, when executed by a processor, cause the processor to perform operations comprising:
   detecting handling-noise with a plurality of noise detectors of a mobile device including a first microphone and a second microphone, the noise detectors to generate noise data in response to the detection of the handling-noise, the mobile device including a case, the case including a front cover and an opposite back cover, the case further including a top edge and an opposite bottom edge, the handling-noise being related to a command gesture that is performed on the back cover of the mobile device;
   processing the noise data generated by the first microphone and by the second microphone of the mobile device to detect and identify the command gesture performing an action in response to the command gesture, the first microphone being located at a first location in the case and the second microphone being located at a second location in the case, wherein the first location is nearer to the top edge of the case than the second location and the second location is nearer to the bottom edge of the case than the first location; and
   performing an action in response to the identified command gesture;
   wherein processing the noise data includes at least the following:
      detecting a location on the back cover of a first component of the command gesture performed on the back cover, the first component of the command gesture including a tap on the surface of the back cover, wherein detecting a location of the first component of the command gesture by performing a calculation based on a time of arrival of when a first noise is detected at the first microphone and at the second microphone; and
      detecting a second component of the command gesture performed on the back cover;
      in response to detecting the second component, determining that noise associated with the second component occurs within a predetermined time after the first noise and performing a comparison with a noise signature, the second component of the command gesture including a swipe across the surface of the back cover; and
      determining whether the command gesture represents a first command for the apparatus based at least in part on: the first component and the second component of the command gesture and the determining that the noise occurs within the predetermined time, and, upon determining that the command gesture represents a first command for the apparatus, performing the first command.

13. The medium of claim 12, further comprising instructions that, when executed by the processor, cause the processor to perform operations comprising:
   rejecting a noise as a command gesture upon a predetermined amount of time elapsing after detection of a first component of the command gesture without detection of a second component of a command gesture.

14. The medium of claim 12, further comprising instructions that, when executed by the processor, cause the processor to perform operations comprising:
   performing a training sequence for the mobile device.

15. The medium of claim 12, wherein the surface of the back cover is not touch sensitive.

16. The medium of claim 12, wherein performing the first command includes scrolling upward or downward on a display screen of the mobile device.

17. A method comprising:
   detecting handling-noise with a plurality of noise detectors of a mobile device including a first microphone and a second microphone, the noise detectors to generate noise data in response to the detection of the handling-noise, the mobile device including a case, the case including a front cover and an opposite back cover, the case further including a top edge and an opposite bottom edge, the handling-noise being related to a command gesture that is performed on the back cover of the mobile device;
   processing noise data generated by the first microphone and by the second microphone of the mobile device to detect and identify the command gesture performing an action in response to the command gesture, the first microphone being located at a first location in the case and the second microphone being located at a second location in the case, wherein the first location is nearer to the top edge of the case than the second location and the second location is nearer to the bottom edge of the case than the first location; and
   performing an action in response to the identified command gesture;
   wherein processing the noise data includes at least the following:
      detecting a location on the back cover of a first component of the command gesture performed on the back cover, the first component of the command gesture including a tap on the surface of the back cover, wherein detecting a location of the first component of the command gesture by performing a calculation based on a time of arrival of when a first noise is detected at the first microphone and at the second microphone; and
      detecting a second component of the command gesture performed on the back cover;
      in response to detecting the second component, determining that noise associated with the second component occurs within a predetermined time after the first noise and performing a comparison with a noise signature, the second component of the command gesture including a swipe across the surface of the back cover; and determining whether the command gesture represents a first command for the apparatus based at least in part on: the first component and the second component of the command gesture and the determining that the noise occurs within the predetermined time, and, upon determining that the command gesture represents a first command for the apparatus, performing the first command.

18. The method of claim 17, further comprising:

rejecting a noise as a command gesture upon a predetermined amount of time elapsing after detection of a first component of the command gesture without detection of a second component of a command gesture.

19. The method of claim 17, wherein the surface of the back cover is not touch sensitive.

20. The method of claim 17, wherein performing the first command includes scrolling upward or downward on a display screen of the mobile device.

\* \* \* \* \*